(12) United States Patent
Yamaga (10) Patent No.: US 6,263,305 B1
(45) Date of Patent: *Jul. 17, 2001

(54) SOFTWARE DEVELOPMENT SUPPORTING SYSTEM AND ROM EMULATION APPARATUS

(75) Inventor: Hiroyuki Yamaga, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/127,771

(22) Filed: Jul. 31, 1998

(30) Foreign Application Priority Data

Jul. 31, 1997  (JP) .................................. 9-220007

(51) Int. Cl.[7] ...................................................... G06F 7/00
(52) U.S. Cl. ................................ 703/25; 703/27; 703/20; 710/102
(58) Field of Search ................................ 703/25, 27, 20, 703/28; 710/102, 104

(56) References Cited

U.S. PATENT DOCUMENTS

| 5,068,852 | * | 11/1991 | Locke | 371/16.2 |
|---|---|---|---|---|
| 5,446,869 | * | 8/1995 | Padgett et al. | 395/500 |
| 5,517,650 | * | 5/1996 | Bland et al. | 395/750 |
| 5,768,563 | * | 6/1998 | Porter et al. | 395/500 |
| 5,794,013 | * | 8/1998 | McBrearty | 395/500 |
| 5,802,327 | * | 9/1998 | Hawley et al. | 395/281 |
| 5,819,056 | * | 10/1998 | Favor | 395/380 |
| 5,890,002 | * | 3/1999 | Li et al. | 395/733 |
| 5,898,858 | * | 4/1999 | Gillespie | 395/500 |

FOREIGN PATENT DOCUMENTS

| 61-112247 | 5/1986 | (JP) | G06F/11/22 |
|---|---|---|---|
| 64-9542 | 1/1989 | (JP) | G06F/11/22 |
| 4-124657 | 11/1992 | (JP) | G06F/3/12 |
| 4-332051 | 11/1992 | (JP) | G06F/11/28 |
| 5-162416 | 6/1993 | (JP) | G06F/3/12 |
| 6-149509 | 5/1994 | (JP) | G06F/3/12 |

* cited by examiner

Primary Examiner—Kevin J. Teska
Assistant Examiner—Thai Phan
(74) Attorney, Agent, or Firm—McGuireWoods LLP (57) ABSTRACT

A software development supporting system of the ROM emulation type is provided, which facilitates the electrical connection to a target system equipped with no ROM socket. This system is comprised of a ROM controller electrically connectable to a PCI bus of a target system, a ROM emulator for emulating an operation of a target ROM mounted on the target system, and a host computer electrical connected to the ROM emulator. The ROM controller receives a control signal for controlling the target ROM, in which the control signal is transmitted through the PCI bus of the target system. The ROM controller transfers the received control signal to the ROM emulator, thereby controlling the ROM emulator. Preferably, the ROM controller is designed to output an access assertion signal to the PCI bus before a ROM controller of the target system outputs an access assertion signal of the target ROM. Thus, the ROM emulator serves to emulate the target ROM using the control signal.

11 Claims, 6 Drawing Sheets

SOFTWARE DEVELOPMENT SUPPORTING SYSTEM AND ROM EMULATION APPARATUS

BACKGROUND OF THE INVENTION

1. Field of the Invention

The present invention relates to a software development tool and more particularly, to a software development supporting system of the Read-Only memory (ROM) emulation type and a ROM emulation apparatus that are designed for a microprocessor-based target system having a Peripheral Component Interconnector (PCI) bus, in which a target ROM is controlled by a ROM controller through the PCI bus under the control of a microprocessor.

2. Description of the Prior Art

A conventional software development supporting system of this sort is disclosed in the Japanese Non-Examined Patent Publication No. 64-9542 published in January 1989.

This conventional system includes a ROM emulator designed to be electrically connected to a host computer. This ROM emulator is equipped with a user Random-Access Memory (RAM) for storing a user program, a trace RAM for storing a trace program, and a controller for controlling the user and trace programs and the emulation procedure. Further, this ROM emulator has a probe for electrically connecting this ROM emulator to a user system or target system on which a Central Processing Unit (CPU) and a target ROM are mounted. The probe of the ROM emulator is designed to be electrically coupled with the target ROM.

When a user program is produced or developed in the host computer, this user program is transmitted to the user RAM mounted on the ROM emulator and stored therein. Then, the user program in the user RAM is traced on the ROM emulator using the trace program stored in the trace RAM under the control of the CPU and the controller. The ROM emulator emulates the operation of the target ROM (i.e., the program stored in the target ROM) mounted on the user system.

In the above-described conventional software development supporting system disclosed in the Japanese Non-Examined Patent Publication No. 64-9542, there is a following problem.

Specifically, to electrically connect the ROM emulator to the user system or target system, the probe of the ROM emulator needs to be coupled with a ROM socket fixed on the target system for mounting the target ROM. This means that a ROM socket is necessarily mounted on the target system for electrical coupling of the ROM emulator. Therefore, this conventional software development supporting system is unable or very difficult to be electrically connected to a user or target system in which a target ROM is directly fixed onto a system board with solder and no ROM socket is equipped for the target ROM.

For example, to electrically connect this conventional software development supporting system to the user or target system, a ROM socket needs to be temporarily mounted on the system board after the target ROM isolated onto the system board is removed therefrom.

A dedicated ROM socket for the ROM emulator may be provided on the user system in advance. In this case, however, this dedicated ROM socket will causes a disadvantage that the size and cost of the system board is increased.

SUMMARY OF THE INVENTION

Accordingly, an object of the present invention is to provide a software development supporting system of the ROM emulation type that facilitates the electrical connection to a target system equipped with no ROM socket.

Another object of the present invention is to provide a software development supporting system of the ROM emulation type that is able to be electrically connected to a target system through a PCI bus.

Still another object of the present invention is to provide a ROM emulation apparatus that is applicable to ROM emulation of a target system equipped with a PCI bus.

The above objects together with others not specifically mentioned will become clear to those skilled in the art from the following description.

According to a first aspect of the present invention, a software development supporting system is provided, which is comprised of a ROM controller electrically connectable to a PCI bus of a target system, a ROM emulator for emulating an operation of a target ROM mounted on the target system, and a host computer electrical connected to the ROM emulator.

The ROM controller receives a control signal for controlling the target ROM, in which the control signal is transmitted through the PCI bus of the target system. The ROM controller transfer the received control signal to the ROM emulator, thereby controlling the ROM emulator.

With the software development supporting system according to the first aspect of the present invention, the ROM controller is electrically connectable to a PCI bus of a target system, and a control signal for controlling a target ROM of the target system is transmitted through the PCI bus to the ROM controller. Also, the ROM controller receives the control signal and then, transfers the received control signal to the ROM emulator, thereby controlling the ROM emulator. Thus, the ROM emulator performs an emulation operation of the target ROM using the control signal transmitted through the PCI bus.

As a result, even if a target system is equipped with no ROM socket, electrical connection to this target system is readily realized by electrically connecting the software development supporting system according to the first aspect to the PCI bus of the target system.

This means that the software development supporting system according to the present invention is able to be electrically connected to the target system through the PCI bus.

In a preferred embodiment of the system according to the first aspect of the present invention, the ROM controller is designed to output an access assertion signal to the PCI bus before a ROM controller of the target system outputs an access assertion signal to the target ROM. Thus, the ROM emulator serves to emulate the target ROM using the control signal.

In this case, there is an additional advantage that the ROM emulator is readily driven with the use of the control signal for the target ROM.

In another preferred embodiment of the system according to the first aspect of the present invention, the ROM controller and the ROM emulator are mounted on a same emulation board. The emulation board is designed to be applicable to a PCI slot electrically connected to the PCI bus.

In this case, there is an additional advantage that the software development supporting system according to the first aspect of the present invention can be readily attached to the target system on use.

In still another preferred embodiment of the system according to the first aspect of the present invention, the ROM controller is mounted on an emulation board and the ROM emulator is not mounted on the emulation board. The emulation board has a ROM socket for electrical connection to the ROM emulator. The ROM emulator is electrically connected to the ROM controller through the ROM socket.

In this case, there is an additional advantage that a conventional ROM emulator is applicable to the software development supporting system according to the first aspect of the present invention.

According to a second aspect of the present invention, a ROM emulation apparatus is provided, which is comprised of a substrate having a first input/output (I/O) interface for electrically connection to a PCI bus of a target system and a second I/O interface for electrically connection to an external host computer, a ROM controller mounted on the substrate and electrically connected to the first I/O interface, and a ROM emulator for emulating an operation of a target ROM mounted on the target system.

The ROM controller receives a control signal for controlling the target ROM through the first I/O interface of the substrate, in which the control signal is transmitted through the PCI bus of the target system. The ROM controller transfers the received control signal to the ROM emulator, thereby controlling the ROM emulator.

With the ROM emulation apparatus according to the second aspect of the present invention, because of substantially the same reason as that of the software development supporting system according to the first aspect of the present invention, this apparatus is able to be electrically connected to a target system equipped with a PCI bus.

In a preferred embodiment of the apparatus according to the second aspect of the present invention, the ROM controller is designed to output an access assertion signal to the PCI bus before a ROM controller of the target system outputs an access assertion signal of the target ROM. Thus, the ROM emulator serves to emulate the target ROM using the control signal.

In this case, there is an additional advantage that the ROM emulator is readily driven with the use of the control signal for the target ROM.

In another preferred embodiment of the apparatus according to the second aspect of the present invention, the ROM emulator is mounted on the substrate.

In this case, there is an additional advantage that the ROM emulation apparatus according to the second aspect of the present invention can be readily attached to the target system on use.

In still another preferred embodiment of the apparatus according to the second aspect of the present invention, the ROM emulator is not mounted on the substrate. The substrate has a ROM socket for electrical connection to the ROM emulator. The ROM emulator is electrically connected to the ROM controller through the ROM socket.

In this case, there is an additional advantage that a conventional ROM emulator is applicable to the ROM emulation apparatus according to the second aspect of the present invention.

Any microprocessor-based system is applicable to the target system of the software development supporting system according to the first aspect of the present invention and the ROM emulation apparatus according to the second aspect of the present invention.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Preferred embodiments of the present invention will be described in detail below while referring to the drawings attached.

First Embodiment

Figure 1:
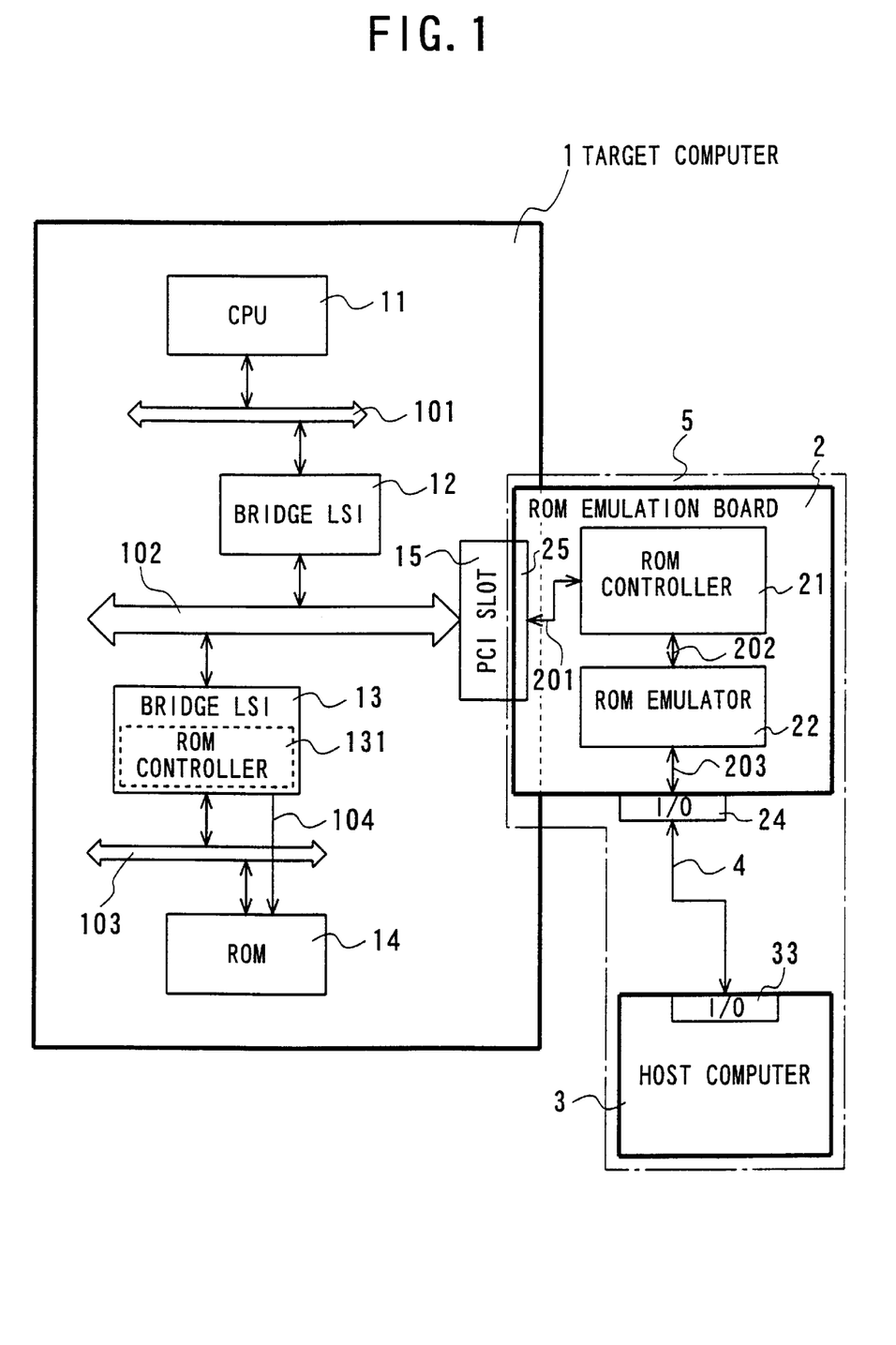
FIG. 1 is a block diagram showing the configuration of a software development supporting system according to a first embodiment of the present invention, in which the software development supporting system is electrically connected to a target computer through a PCI bus slot.

As shown in FIG. 1, a software development supporting system 5 according to a first embodiment of the present invention is comprised of a ROM emulation board 2 and a host computer 3 for controlling the ROM emulation board 2. This supporting system 5 is used to diagnose (for example, trace and/or debug) a ROM program which has been developed on the host computer 3 for a target computer 1.

The target computer 1 includes a CPU 11, a Large-Scale Integrated bridge circuit (bridge LSI) 12, a bridge LSI 13, a system ROM 14, a PCI expansion slot 15, a local bus 101, a PCI bus 102, and an Industrial Standard Architecture (ISA) bus 103.

The ISA bus 103 is not capable of high-speed signal transmission. Therefore, the ISA bus 103 is usually used for electrical connection to low-speed ISA devices such as a memory and an I/O device or circuit. On the other hand, the local bus 101 is electrically connected to the CPU 11 directly and therefore, it is capable of high-speed signal transmission compared with the ISA bus 103. Although the PCI bus is electrically connected to the CPU 11 through the bridge LSI 12, it is capable of high-speed signal transmission compared with the ISA bus 103.

The CPU 11 controls various procedures such as execution of the ROM program thus developed. The bridge LSI 12 serves to link the local bus 101 and the PCI bus 102 together. The bridge LSI 13 serves to link the PCI bus 102 and the ISA bus 103 together. The system ROM 14, which is electrically connected to the ISA bus 14, stores the ROM program thus developed. The PCI expansion slot 15 receives the I/O section 25 of the ROM emulation board 2 and electrically connects the board 2 to the PCI bus 102.

An I/O connector 24 of the ROM emulation board 2 is electrically connected to an I/O connector 33 of the host computer 3 with the use of a cable 4, thereby electrically connecting the ROM emulation board 2 to the host computer 3.

The host computer 3 has an input device (not shown) such as a keyboard and a mouse to take an input from a user (or operator) into the host computer 3 and an output device (not shown) such as a display monitor to display an output of the host computer 3 thereon.

When a signal such as a control, address, or data signal is outputted from the CPU 11, the signal is directly transmitted to the local bus 101, to the PCI bus 102 through the local bus 101 and the bridge LSI 12, and to the ISA bus 103 through the local bus 101 and the two bridge LSIs 12 and 13, respectively. Since the ROM emulation board 2 is electrically connected to the PCI bus 102 through the PCI slot 15 and the I/O section 25, the signal may be transferred to the ROM emulation board 2.

Figure 2:
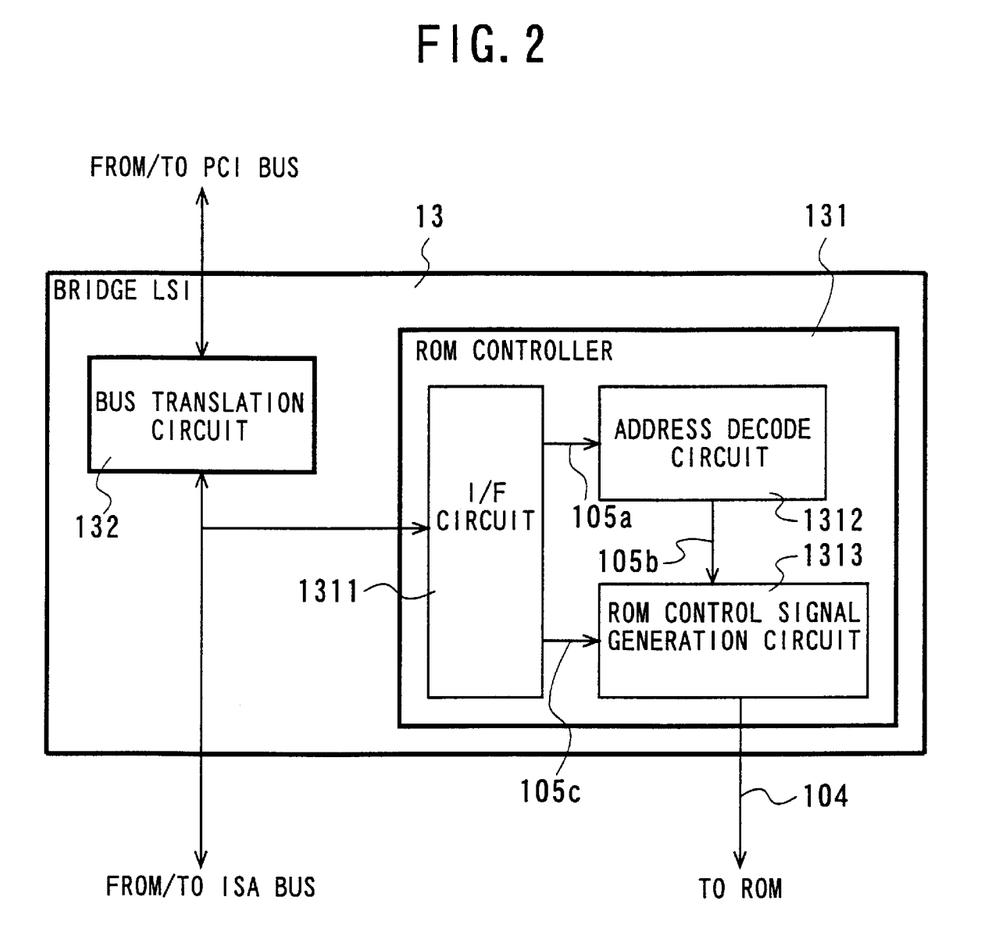
FIG. 2 is a block diagram showing the configuration of a bridge LSI mounted on the target computer shown in FIG. 1.

The detailed configuration of the bride LSI 13 of the target computer 1 is shown in FIG. 2.

As seen from FIG. 2, the bridge LSI 13 is comprised of a ROM controller 131 and a bus translation circuit 132.

The ROM controller 131, which is electrically connected to the system ROM 14 through a signal line 104, controls the ROM 14 according to the instructions from the CPU 11.

The ROM controller 131 includes an I/F circuit 1311, an address decode circuit 1312, and a ROM control signal generation circuit 1313. The I/F circuit 1311 serves as a buffer between the ISA bus 103 and the inside of the ROM controller 131. The address decode circuit 1312 decodes the address signal for the ROM 14 transmitted through the I/F circuit 1311 and a signal line 105a, and checks whether the ROM 14 is selected or not in this address signal. The ROM control signal generation circuit 1313 generates select, control, and address signals for the ROM 14 and transmits the signals thus generated to the ROM 14 through the signal line 104. The program stored in the ROM 14 is read out according to the control and address signals.

The bus translation circuit 132 serves to electrically connect the PCI bus 102 to the ISA bus 103 through bus translation. Also, the bus translation circuit 132 has a function of asserting that none of the PCI devices are selected using a device select signal DEVSEL# through the subtraction decoding operation, which will be explained below.

The ROM emulation board 2 has the following configuration.

As seen from FIG. 1, the ROM emulation board 2 is equipped with a ROM controller 21 and a ROM emulator 22.

The ROM controller 21, which is electrically connected to the PCI bus 102 through a signal line 201, has a function of controlling the ROM emulator 22 according to the instructions from the CPU 11. Also, the ROM controller 21 has a function of activating or selecting the ROM emulator 22 instead of the ROM 14 of the target computer 1 using the control signal or signals for the ROM 14.

The ROM emulator 22 is electrically connected to the ROM controller 21 through a signal line 202 and to the I/O port 24 through a signal line 203.

The ROM emulator 22 has not only an emulation function of the operation of the ROM 14 (i.e., the procedures of the program stored in the ROM 14) mounted on the target computer 1 but also a diagnosing function of the operation or procedure of the program stored in the ROM 14 such as execution control, change, and real-time trace control of the program, and monitoring and change of registers. The diagnosing function is carried out on the basis of the commands which have been inputted into the host computer 3 by the user and transmitted therefrom.

Figure 3:
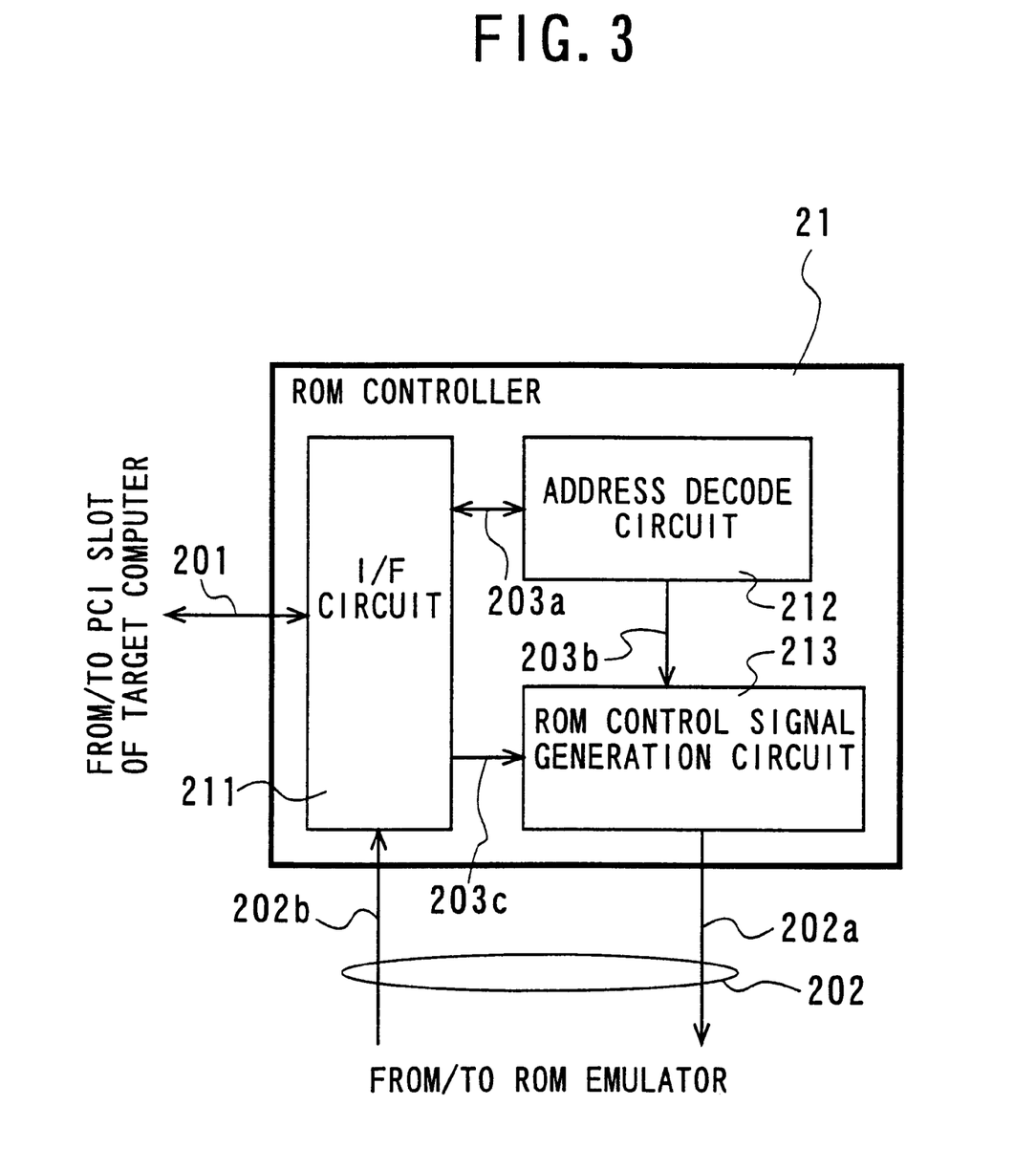
FIG. 3 is a block diagram showing the configuration of the ROM controller of the software development supporting system according to the first embodiment of FIG. 1.

As shown in FIG. 3, the ROM controller 21 includes an I/F circuit 211, an address decode circuit 212, and a ROM control signal generation circuit 213.

The I/F circuit 211 is electrically connected to the PCI bus 102 through the signal line 201, to the address decode circuit 212 through a signal line 203a, to the ROM control signal generation circuit 213 through a signal line 203c, and the ROM emulator 22 through a signal line 202b, respectively.

The address decode circuit 212 is electrically connected to the ROM control signal generation circuit 213 through a signal line 203b.

The ROM control signal generation circuit 213 is electrically connected to the ROM emulator 22 through a signal line 202a.

The I/F circuit 211 serves as a buffer between the PCI bus 102 and the inside of the ROM controller 21.

The address decode circuit 212 has a function of decoding the address of the ROM 14 and checks whether the ROM emulator 22 is selected or not. The address decode circuit 212 has an additional function of asserting the selection of the ROM 14 using the device-select signal (DEVSEL#).

The ROM control signal generation circuit 213 generates select, control, and address signals for the ROM emulator 22 and transmits these signals thus generated to the ROM emulator 22 through the signal line 202a. The select, control, and address signals are transmitted to the ROM emulator 22 through the signal line 202a. The timing or clock signal is transmitted to the ROM control signal generation circuit 213 through the I/F circuit 211 and the signal line 203c.

Next, the operation of the software development supporting system 5 according to the first embodiment of the present invention is explained below with reference to FIGS. 4A to 4E and FIGS. 5A to 5E.

FIGS. 4A to 4E and FIGS. 5A and 5E show the response of the bus slave (i.e., the bridge LSI 13) with respect to the access from the bus master (i.e., the bridge LSI 12) to the ROM 14 within a read cycle of the PCI bus 102.

Figure 4A:
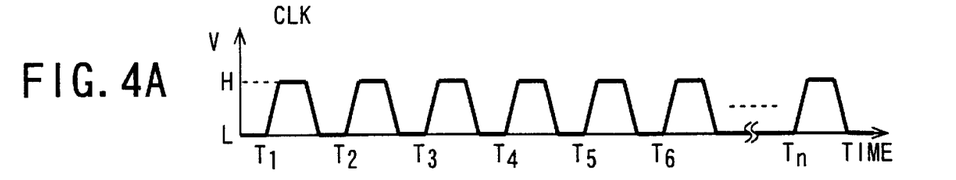
FIGS. 4A to 4E are timing charts showing the time-dependent waveforms of the signals transmitted through the PCI bus of the target computer, respectively, in which the ROM of the target computer is selected.
Figure 5A:
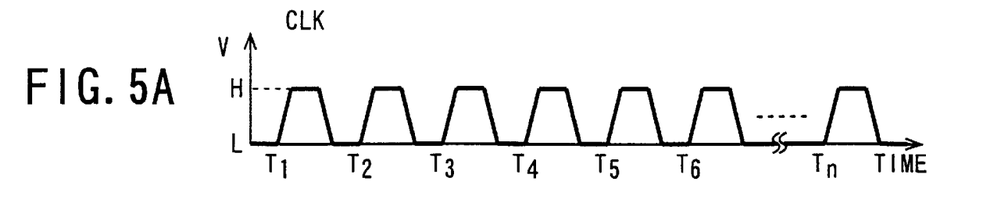
FIGS. 5A to 5E are timing charts showing the time-dependent waveforms of the signals transmitted through the PCI bus of the target computer, respectively, in which the ROM emulator of the software development supporting system according to the first embodiment of FIG. 1 is selected.

The signal CLK shown in FIGS. 4A and 5A denotes the clock signal of the PCI bus 102, which is generated by the clock generator (not shown) for the PCI bus 102.

Figure 4B:
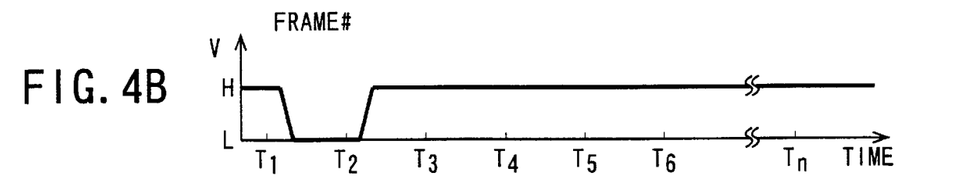
Figure 5B:
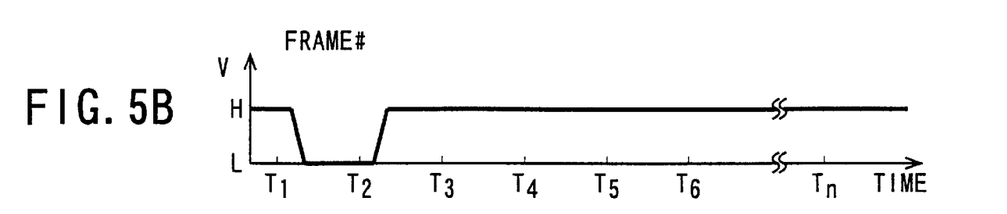

The signal FRAME# shown in FIGS. 4B and 5B denotes the signal indicating the start of the cycle of the PCI bus 102, which is the type of active low. The signal FRAME# is outputted by the bus master of the PCI bus 102 (i.e., the bridge LSI 12). Here, the read cycle starts at the timing T1 when the level of the signal FRAME# is turned from high (H) to low (L).

Figure 4C:
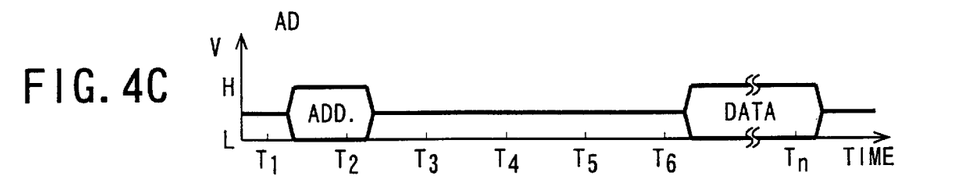
Figure 5C:
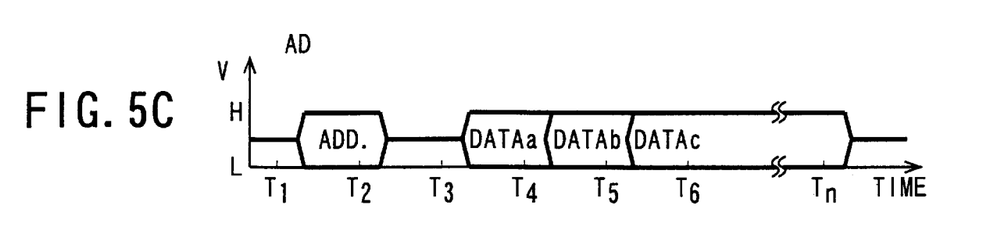

The signal AD shown in FIGS. 4C and 5C denotes a multiplexed address/data signal. The address signal is outputted at the timing T1 when the read cycle starts (i.e., the level of the signal FRAME# is turned from high to low). The data signal is outputted after a specific time period has passed from the start of the read cycle. In FIG. 4C, the data signal is outputted at the timing T6 when the sixth clock signal CLK has passed. In FIG. 5C, the data signal is outputted at the timing T3, T4, or T5 when the third, fourth, of fifth clock signal CLK has passed.

Figure 4D:
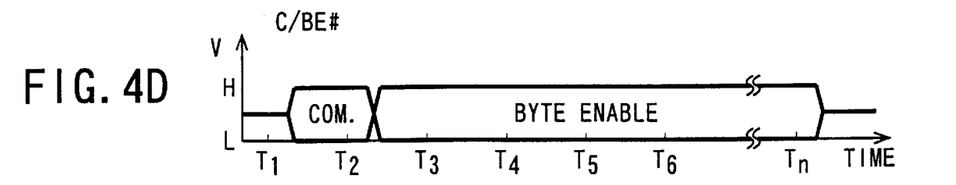
Figure 5D:
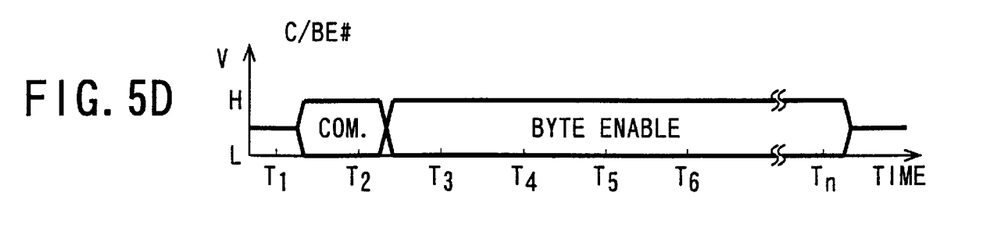

The signal C/BE# shown in FIGS. 4D and 5D denotes a multiplexed command/byte-enable signal. The command signal is outputted at the timing T1 when the read cycle starts. The byte-enable signal is outputted immediately after the output of the command signal is completed. The output of the byte-enable signal continues until the output of the data signal in FIGS. 4C and 5C is stopped.

Figure 4E:
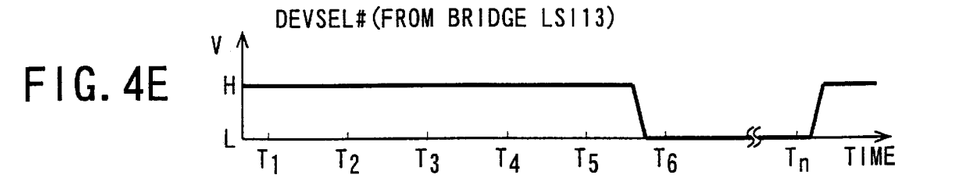
Figure 5E:
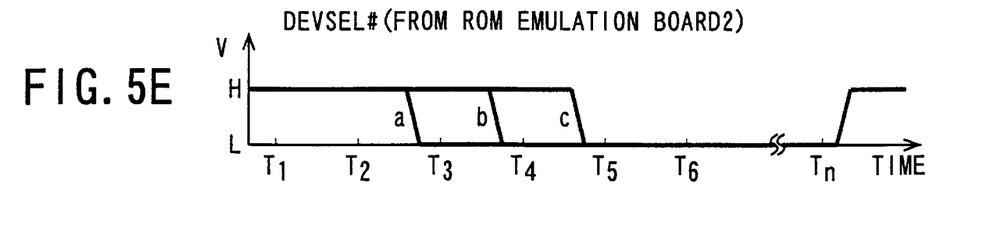

The device-select signal DEVSEL# shown in FIGS. 4E and 5E denotes a device-select signal, which is the type of tri-state. In FIGS. 4E, this signal DEVSEL# is outputted at the timing T6 when the fifth clock signal CLK has passed, i.e., when the bus slave (i.e., the bridge LSI 13) is accessed. In FIG. 5E, this device-select signal DEVSEL# is outputted at the timing T2, T3, or T4 when the second, third, or fourth clock signal CLK has passed.

When the CPU 11 reads out the program (or instruction of the program) stored in the system ROM 14, the control and address signals are outputted from the CPU 11 toward the ROM 14. The control and address signals thus outputted are transferred to the bridge LSI 12 through the local bus 101.

Then, the bridges LSI 12 translates the control and address signals thus transferred so that they accord with the transfer timing and protocol of the PCI bus 102, thereby outputting the device-select, address/data, and command/byte-enable signals DEVSEL#, AD, and C/BE# to the PCI bus 102. This signal output is conducted to be synchronized with the clock signal CLK of the PCI bus 102.

According to the standard of the PCI bus, when PCI devices (not shown) are electrically connected to the target computer 1 through the PCI bus 102, the PCI devices detect the device-select signal DEVSEL# to know whether they are selected. If at least one of the PCI devices is selected by a command and address from the CPU 11 within the read cycle of the PCI bus 102, the PCI device (or devices) in question needs to assert (or asserts) that it is (or they are) selected by the command and address using the device-select signal DEVSEL#.

If none of the PCI devices connected to the PCI bus 102 asserts their selection within a specific period (here, by the timing T5 when the fifth clock signal CLK is outputted), the device-select signal DEVSEL# is turned from high (H) to low (L) after the fifth clock signal CLK has passed in order to assert that none of the PCI devices are selected, as shown in FIG. 4E. This operation is called the "subtraction decoding procedure".

In the target computer 1, the bridge LSI 13 is provided between the PCI bus 102 and the ISA bus 103. Therefore, the "subtraction decoding procedure" is carried out by the bridge LSI 13, the reason of which is as follows.

If the command from the CPU 11 includes access to any of the PCI devices, the PCI device in question always asserts that this device is selected or accessed by the command and address using the device-select signal DEVSEL#. Therefore, if no assertion is seen from the device-select signal DEVSEL#, it may be supported that this command includes access to any of the ISA devices rather than the PCI devices.

As a result, when no assertion is seen from the device-select signal DEVSEL# by the timing T4, the device-select signal DEVSEL# is turned from high to low at the timing T5, thereby activating or starting the read cycle of the ISA bus 103 in the target computer 1.

Then, the selection or access of the ISA devices (not shown), which are electrically connected to the target computer 1 through the ISA bus 103, is checked in the following way.

The bus translation circuit 132 of the bridge LSI 13 translates the control and address signals thus transmitted from the CPU 11 so that they accord with the transfer timing and protocol of the ISA bus 103.

The I/F circuit 1311 of the ROM controller 131 of the bridge LSI 13 receives the control and address signals thus transmitted and sends them to the address decode circuit 1312 through the signal line 105a. Then, the address decode circuit 1312 judges whether the ROM 14 is selected by the control and address signals thus transmitted or not.

If the ROM 14 is selected, the control and address signals are sent to the ROM control signal generation circuit 1313 through the signal line 105a. The ROM control signal generation circuit 1313 sends the control and address signals thus received to the ROM 14 through the signal line 104.

Thus, the ROM controller 13 reads out the program (or instruction of the program) stored in the ROM 14 in response to the control and address signals thus transmitted from the CPU 11.

The program or instruction thus read out is transmitted to the ISA bus 103 and then, it is transferred to the CPU 11 through the bridge LSI 13, the PCI bus, 102, the bridge LSI 12, and the local bus 101.

The above-described operation of the target computer 1 is changed in the following way after the software development supporting system 5 according to the first embodiment is electrically connected to the target computer 1 through the PCI slot 15.

The clock, device-select, and command/byte-enable signals CLK, FRAME#, and C/BE shown in FIGS. 5A, 5B, and 5D are the same as those in FIGS. 4A, 4B, and 4D, respectively. On the other hand, the address/data and device-select signals AD and DEVSEL# shown in FIGS. 5C and 5E are different from those in FIGS. 4C and 4E, respectively.

When the CPU 11 reads out the program (or instruction) stored in the system ROM 14, the control and address signals are emitted from the CPU 11 toward the ROM 14. The control and address signals are transferred to the bridge LSI 12 through the local bus 101.

Then, the bridge LSI 12 translates the control and address signals thus transferred so that they accord with the transfer timing and protocol of the PCI bus 102, thereby outputting the device-select, address/data, and command/byte-enable signals FRAME#, AD, and C/BE# to the PCI bus 102 as shown in FIGS. 5B, 5C, and 5D, which is synchronized with the clock signal CLK for the PCI bus 102.

Since the I/F circuit 211 of the ROM controller 21 on the ROM emulation board 2 is electrically connected to the PCI bus 102, the device-select, address/data, and command/byte-enable signals FRAME#, AD, and C/BE# thus outputted are applied to the I/F circuit 211. Then, the address decode circuit 212 of the ROM controller 21 judges whether the ROM emulation board 2 (which serves as a PCI device) is selected by the address/data and command/byte-enable signals AD and C/BE# or not while decoding the FRAME#, AD, and C/BE# signals transmitted through the signal line 203a.

If it is found that the system ROM 14 is selected through the decoding procedure by the address decode circuit 212, the ROM emulation board 2 is selected. Then, the address decode circuit 212 asserts that the circuit 212 itself (rather than the ROM 14) is selected using the device-select signal DEVSEL#. This assertion is carried out by turning the level of signal DEVSEL# from high to low at the timing a, b, or c, i.e., at the second, third, and fourth clock signal T2, T3, or T4, as shown in FIG. 5E. The device-select signal DEVSEL# is transferred to the PCI bus 102 through the I/O section 25 and the PCI slot 15.

The address signal is sent to the ROM emulator 22 through the I/F circuit 211 and the ROM control signal generation circuit 213. In response to the address and data signals, the ROM emulator 22 outputs the corresponding program (or procedure) to the I/F circuit 211 through the signal line 202b.

The program or instruction thus outputted from the ROM emulator 22 is transferred to the CPU 11 through the signal line 201, the I/O section 25, the PCI slot 15, the PCI bus 102, the bridge LSI 12, and the local bus 101.

These processes are carried out on the ROM emulation board 2 to be synchronized with the clock signal for the PCI bus 102.

As described above, when the software development supporting system 5 is electrically connected to the target computer 1, the ROM controller 21 and the ROM emulator 22 mounted on the ROM emulation board 2 are operated instead of the ROM controller 131 and the ROM 14 of the target computer 1, respectively.

With the software development supporting system 5 according to the first embodiment of the present invention, as described above, the ROM controller 21 mounted on the ROM emulation board 2 is electrically connectable to the PCI bus 102 of the target computer 1, and the control signals for controlling the target ROM 14 of the target computer 1 is transmitted through the PCI bus 102 to the ROM controller 21. Also, the ROM controller 21 receives the control signals and then, transfers the received control signals to the ROM emulator 22 mounted on the ROM emulation board 2, thereby controlling the ROM emulator 22. Thus, the ROM emulator 22 performs an emulation operation of the target ROM 14 using the control signals transmitted through the PCI bus 102.

As a result, although the target computer 1 is equipped with no ROM socket, electrical connection to this target computer 1 is readily realized by electrically connecting the software development supporting system 5 according to the first embodiment to the PCI bus 102 of the target computer 1.

It is obvious that the software development supporting system 5 according to the first embodiment is able to be electrically connected to the target computer 1 through the PCI bus 102.

Additionally, no change is required for hardware and software of the target computer 1 for the purpose of adapting the target computer 1 to the software development supporting system 5. This is because the operation of the ROM controller 21 of the ROM emulation board 2 is designed in conformity with the standard of the PCI bus.

Second Embodiment

Figure 6:
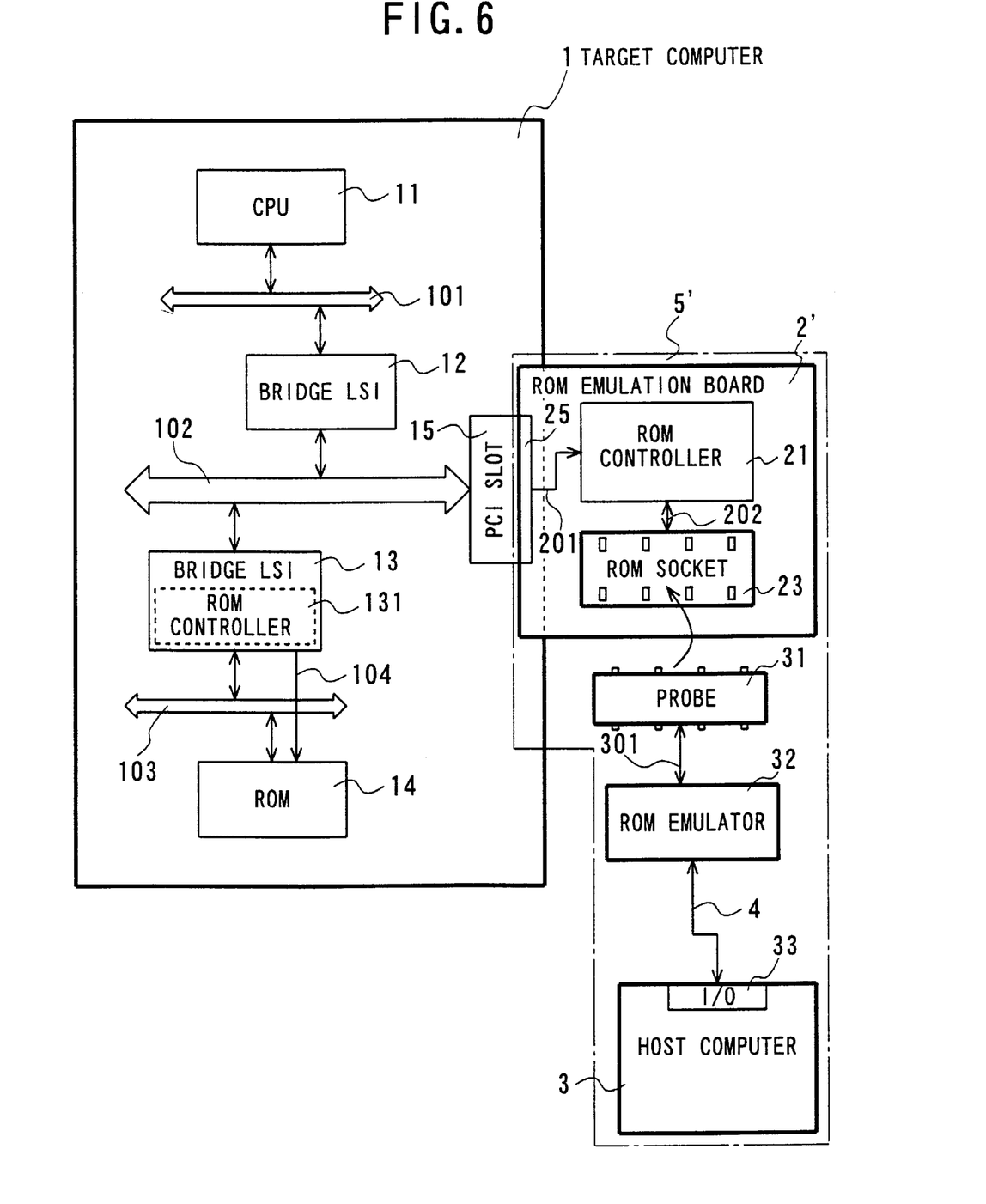
FIG. 6 is a block diagram showing the configuration of a software development supporting system according to a second embodiment of the present invention, in which the software development supporting system is electrically connected to a target computer and a conventional ROM emulator system is used as the ROM emulator.

FIG. 6 shows a software development supporting system 5' according to a second embodiment of the present invention, which has the same configuration as that of the first embodiment except that a ROM socket 23 is mounted on a ROM emulation board 2' and a ROM emulator 32 is electrically connected to the host computer 3 through a probe 31.

Therefore, the explanation about the same configuration is omitted here by attaching the same reference numerals to the same or corresponding elements in FIG. 6 for the sake of simplification.

Since the ROM emulator 32 is not mounted on the ROM emulation board 2', the previously-explained conventional ROM emulator may be used as the ROM emulator 32.

There is an additional advantage that the configuration of the ROM emulation board 2' is simplified compared with the ROM emulation board 2 according to the first embodiment, together with the same advantage of the first embodiment.

While the preferred forms of the present invention has been described, it is to be understood that modifications will be apparent to those skilled in the art without departing from the spirit of the invention. The scope of the invention, therefore, is to be determined solely by the following claims.

What is claimed is:

1. A software development supporting system comprising:
    a read-only-memory (ROM) controller contained in a peripheral component interface (PCI) card electrically connectable to a PCI bus of a target system;
    a ROM emulator for emulating an operation of a target ROM mounted to a system board with a central processing unit (CPU) for said target system when said target ROM is still mounted to said system board; and
    a host computer electrically connected to said ROM emulator,
    wherein said ROM controller receives a control signal for controlling said target ROM, in which said control signal is transmitted through said PCI bus of said target system,
    and wherein said ROM controller transfers said received control signal to said ROM emulator, thereby controlling said ROM emulator.

2. The system as claimed in claim 1, wherein said ROM controller is designed to output an access assertion signal to said PCI bus before a ROM controller of said target system outputs an access assertion signal of said target ROM,
    whereby the ROM emulator serves to emulate said target ROM using said control signal.

3. The system as claimed in claim 1, wherein said ROM controller and said ROM emulator are mounted on a same emulation board;
    and wherein said emulation board is designed to be applicable to a PCI slot electrically connected to said PCI bus.

4. The system as claimed in claim 1, wherein said ROM controller is mounted on an emulation board and said ROM emulator is separate from said emulation board;
    and wherein said emulation board has a ROM socket for electrical connection to said ROM emulator, thereby electrically connecting said ROM emulator to said ROM controller through said ROM socket.

5. A read-only-memory (ROM) emulation apparatus comprising:
    a substrate comprising a peripheral component interface (PCI) card having a first input/output (I/O) interface for electrical connection to a PCI bus of a target system and a second I/O interface for electrical connection to an external host computer;
    a ROM controller mounted on said substrate and electrically connected to said first I/O interface; and
    a ROM emulator for emulating an operation of a target ROM connected to a system board with a central processing unit (CPU) for said target system when said target ROM is still connected to said system board,
    wherein said ROM controller receives a control signal for controlling said target ROM through said first I/O interface, in which said control signal is transmitted through said PCI bus of said target system,
    and wherein said ROM controller transfers said received control signal to said ROM emulator, thereby controlling said ROM emulator.

6. The apparatus as claimed in claim 5, wherein said ROM controller is designed to output an access assertion signal to said PCI bus before a ROM controller of said target system outputs an access assertion signal of said target ROM;

whereby said ROM emulator serves to emulate said target ROM using said control signal.

7. The apparatus as claimed in claim 5, wherein said ROM emulator is mounted on said substrate.

8. The apparatus as claimed in claim 5, wherein said ROM emulator is detached from said substrate;

and wherein said substrate has a ROM socket for electrical connection to said ROM emulator, and said ROM emulator is electrically connected to said ROM controller through said ROM socket.

9. A read-only-memory (ROM) emulation system for emulating a ROM memory mounted to a system board in a target computer, comprising:

a peripheral component interface (PCI) card for electrical connection to a PCI bus of a target computer;

a ROM controller on said PCI card;

an input/output (I/O) interface for connecting said PCI card to a host computer; and a ROM emulation module connected between said ROM controller and said I/O interface for storing program data from the host computer, wherein said ROM controller on said PCI card intercepts a control signal on the PCI bus meant for a ROM controller in the target computer and responds to said control signal prior to the ROM controller in said target computer, wherein said target computer begins reading said program data stored in said ROM emulation module as if it were reading from the ROM memory in the target computer.

10. A read-only-memory (ROM) emulation system for emulating a ROM memory mounted to a system board in a target computer as recited in claim 9 wherein said ROM emulation module is included on said PCI card.

11. A read-only-memory (ROM) emulation system for emulating a ROM memory mounted to a system board in a target computer as recited in claim 9, further comprising:

a ROM socket connected to said ROM controller on said PCI card; and a probe connected to said ROM emulation module, said probe shaped to electrically plug into said ROM socket.

* * * * *